United States Patent [19]

Hatada

[11] Patent Number: 5,463,730
[45] Date of Patent: Oct. 31, 1995

[54] METHOD AND APPARATUS FOR SELECTING AND DISPLAYING A PROCESS DURING PREPRESS PROCESSING OF AN IMAGE

[75] Inventor: Koji Hatada, Kyoto, Japan

[73] Assignee: Dainippon Screen Mfg., Co., Ltd., Japan

[21] Appl. No.: 157,633

[22] Filed: Nov. 24, 1993

[30] Foreign Application Priority Data

Nov. 30, 1992 [JP] Japan .................. 4-345367

[51] Int. Cl.$^6$ .................. G06F 15/72
[52] U.S. Cl. .................. 395/161
[58] Field of Search .................. 395/133, 155, 395/156, 157, 140, 159, 160, 161

[56] References Cited

U.S. PATENT DOCUMENTS

| | | | |
|---|---|---|---|
| 5,396,590 | 3/1995 | Kreegar | 395/159 |
| 5,408,601 | 4/1995 | Nakamura et al. | 395/155 |

Primary Examiner—Mark R. Powell
Assistant Examiner—Sharon Fenick
Attorney, Agent, or Firm—Ostrolenk, Faber, Gerb & Soffen

[57] ABSTRACT

The present invention provides a method of and apparatus for selecting and displaying a printing process during prepress processing of one or more selected image parts which distinctively shows a target image part for the selected process, thus improving the working efficiency. When the operator moves a pointer PT to a first image part I1 on a CRT screen with a mouse 22 to select the first image part I1 (FIG. 3A), a menu button MB and a first arrow AL1 running from the menu button MB to the position of the pointer PT are displayed on the CRT screen (FIG. 3B). When the operator further selects a second image part I2 (FIG. 3C), a second arrow running from the menu button MB to the current position of the pointer PT is displayed on the CRT screen (FIG. 3D). When the operator clicks the menu button MB with mouse 22 (FIG. 3E), a pull-down menu MN including a plurality of process titles is displayed on the CRT screen. The operator then clicks the mouse 22 to select a desired title corresponding to a prepress printing process.

23 Claims, 13 Drawing Sheets

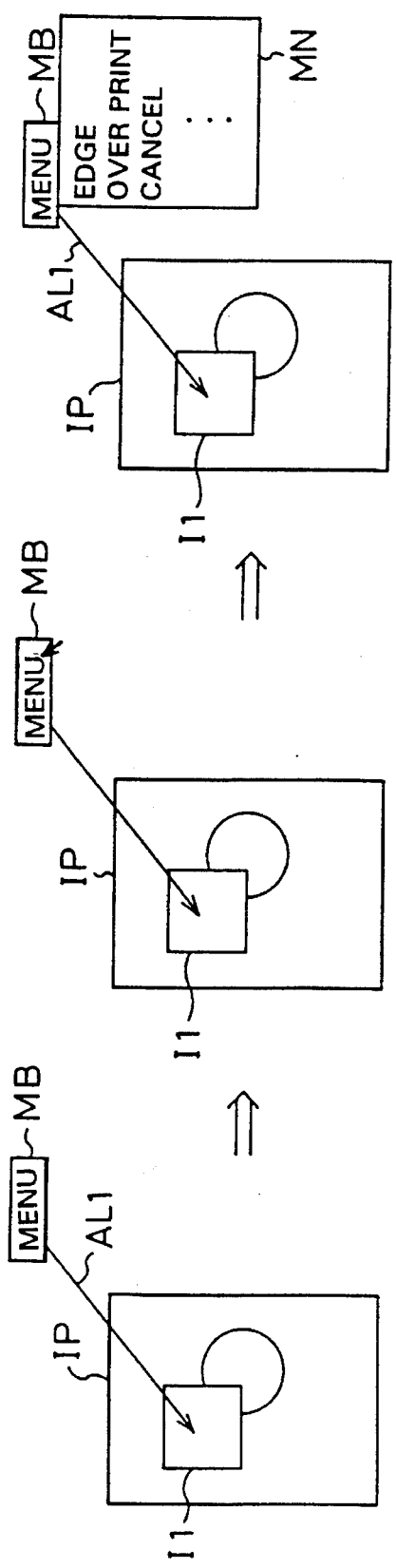
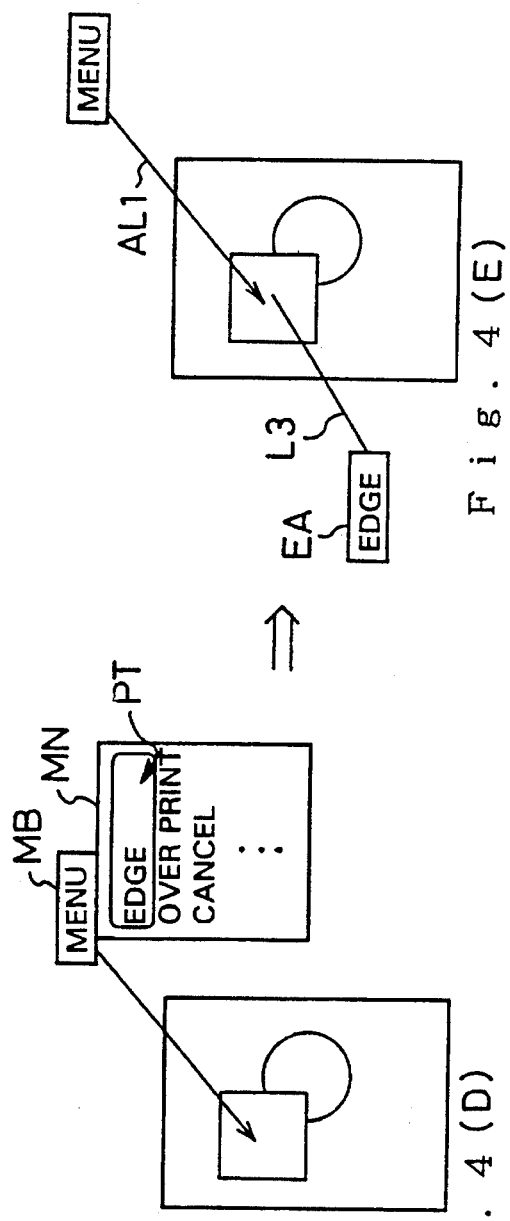
Fig. 4(A)
Fig. 4(B)
Fig. 4(C)
Fig. 4(D)
Fig. 4(E)

|  | IMAGE PART ADDRESS | HIT POINT COORDINATES |  |
|---|---|---|---|
| TBL 1A | 123000 | 30, 80 | TBL 1B |
|  | 0 | 0, 0 |  |

TBL 1

TBL 2

| TITLES OF PROCESS INFORMATION | ADDRESS OF FIRST IMAGE PART | ADDRESS OF SECOND IMAGE PART | ATTRIBUTE DATA |
|---|---|---|---|
| TRAP | 123000 | 123100 | — |
| EDGE | 123100 | 122900 | WIDTH=0.8 |
| OVER PRINT | 123500 | — | — |
| ... | ... | ... | ... |

METHOD AND APPARATUS FOR SELECTING AND DISPLAYING A PROCESS DURING PREPRESS PROCESSING OF AN IMAGE

BACKGROUND OF THE INVENTION

1. Field of the Invention

The present invention relates to a method and an apparatus for selecting and displaying a printing process during prepress processing. In particular, the present invention relates to the selection and display, during prepress processing, of a printing process that is to be executed during the printing of an image displayed on a screen.

2. Description of the Related Art

Image processing systems have recently been developed that allow a computer-aided page make-up process. In such image processing systems, an operator inputs into the system, with a scanner or like element, a variety of image data that represent image parts, such as characters, figures, and pictures. The operator then lays out the image parts as a page for printing through interaction with the image parts that are displayed on a monitor screen.

As a part of the page make-up process, in prepress processing ornamental effects are selected, which are to be included in the final printing of the pages stored in the system. Such ornamental effects, generally known as prepress process information, include outline types, white-open faces, and overlay in an overlapped area between a character and a picture. The operator selects desired ornamental effects, which are then stored in the form of prepress instructions to the page make-up process. Accordingly, in the aforementioned known systems for a page make-up process, during the prepress processing information that represents a specific printing process is selected by the operator and stored in the system for execution when the image part or parts for which the process is selected are printed. A typical method for selecting a desired process is given below.

The operator first selects, by the use of a mouse, a first image part from a plurality of image parts displayed on the screen. The system then highlights the first image part on the monitor screen. Highlighting is a process of enhancing a part of the display by, for example, displaying the selected image part in black or another predetermined color.

The operator then selects using the mouse, and the system highlights, a second image part. In a subsequent step, the operator selects with the mouse a desired menu title from a menu bar having a plurality of menu titles. The system opens a pull-down menu with a plurality of titles representing different printing processes. The operator then clicks the mouse to select a process title, which corresponds to the desired process, and the system stores the selected process title between the first image part and the second image part. As is generally known, the system stores the selected process title in a memory along with the name or address of the first image part and the name or address of the second image part. Accordingly, during printing the contents of the memory then instruct the system that the selected process is to be executed with the printing of the first image part and the second image part.

In the conventional method as described above, the particular image part for which the process is selected is sometimes incorrectly identified by the operator. For example, the operator could mistake two image parts, which are overlapped with each other and are both highlighted on the monitor screen, for a single image part.

The operator generally proceeds with the prepress processing by selecting a process title according to the contents of prepress instruction sheets that are given to the operator. The instructions on such prepress instruction sheets are generally handwritten and correspond to the desired printing processes. FIG. 16 shows an example of such a prepress instruction sheet. In FIG. 16, a process title representing a specific printing process (for example, "Overlaying" or "Black Overprinting" in the drawing) is written at an end of a line that is drawn from the target image part for which the process title is to be selected. The operator checks the prepress instruction sheet and selects a process title corresponding to the desired printing process. The specification of prepress process information in such prepress instruction sheets is, however, quite different from the display on the screen of the conventional apparatus. In the conventional apparatus and method the entire image part is highlighted. This difference in display often confuses the operator who could make mistakes. Accordingly, the conventional method does not distinctly specify the image part for which a certain process title is to be selected and, therefore, gives a feeling of uneasiness to the operator, thereby lowering the working efficiency.

SUMMARY OF THE INVENTION

Therefore, one object of the present invention is to provide an improved method of selecting and displaying a process that is to be executed for an image part during prepress processing. It is desirable that the improved method be in some respects similar to the conventional prepress instructions with which an operator is generally familiar.

Another object of the invention is to display the selected process and its associated image part distinctively, thus improving the operator's ability and working efficiency.

Accordingly, in the present invention when a process title is selected out of a menu, a line is drawn between a predetermined position and the image part for which the process title is selected. The operator can thus find the various image parts for which the specific printing processes have been selected without any trouble or confusion. The method of the present invention that uses the aforementioned line is in some, though not in all, respects similar to the prepress instructions with which the operator is generally familiar, thus improving the operator's ability and working efficiency.

The present invention is directed to an apparatus for selecting and displaying a printing process during prepress processing, in which a plurality of image parts are displayed on a display screen. The apparatus includes image part selector means for selecting at least one image part out of the plurality of image parts displayed on the display screen, the image part being selected by the image part selector means in response to a first external instruction inputted by an operator; switch and line display means for drawing at least one line on the display screen when the image part is selected by the selector means, the line connecting the image part selected by the selector means to a display position on the display screen, and for simultaneously displaying a mark at the display position, the mark being responsive to a second external instruction inputted by the operator such that the mark functions as a switch, the switch having an on and an off mode; menu display means for displaying a menu including a plurality of process titles on the display screen when the switch is in the on mode, the plurality of process titles representing a corresponding plurality of printing processes; process selector means for selecting one of the plurality of process titles in the menu in response to a third instruction inputted by the operator; and memory means for storing the selected process title selected by the process selector means as process information to be executed on the image part selected by the image part selector means.

In a preferred embodiment, the menu display means includes a plurality of sets of process titles and means for selecting one of said plurality of sets for display in the menu according to the number of image parts selected by the image part selector means. Preferably, the plurality of titles of process information to be displayed in the menu include a specific title showing a prepress printing process for two image parts when the number of image parts selected by the image part selector means is equal to two.

Moreover, the plurality of process titles include a specific title showing a prepress printing process for one image part against a background image when the number of image parts selected by the image part selector means is equal to one.

In another embodiment, the plurality of process titles include at least three process titles, "Trap" indicating a process of expanding an overlapped area between two image parts, "Edge" indicating a process of making a margin around a contour of an image, and "Over Print" indicating a process of printing black characters over a background color.

Alternatively, the plurality of process titles include at least two process titles, "Edge" and "Over Print".

According to another aspect of the present invention, the image part selector means further includes: a pointing device for pointing to a desired position on the display screen; and the line drawn by the switch and line display means runs from the desired position set by the pointing device.

Preferably, the menu display means further includes menu position setting means for setting a position of the menu immediately below the mark on the display screen.

According to still another aspect of the present invention, the apparatus also includes selected process display means for displaying the selected process title stored by the process information memory means at a certain position in the vicinity of the image part selected by the image part selector means, and for drawing at least one line connecting the certain position to the image part.

Preferably, the apparatus further includes: display control means for canceling a display of the menu displayed by the menu display means while maintaining a display of the mark and the line displayed by the switch and line display means after the process information selector means selects the selected process title.

According to yet another aspect of the present invention, the apparatus includes title input means for inputting a predetermined process title of process information; extraction means for extracting process information corresponding to the predetermined process title input by the title input means from the process information stored in the process information memory means; and target image part display means for determining a target image part for the process information extracted by the extraction means and for displaying the target image part distinctively from other image parts on the display screen.

The present invention is also directed to a method of selecting and displaying a printing process during prepress processing, in which a plurality of image parts are displayed on a display screen, The method including the steps of: (a) selecting at least one image part out of the plurality of image parts displayed on the display screen in response to a first external instruction; (b) drawing at least one line connecting the image part selected in step (a) to a display position on the display screen and simultaneously displaying a mark at the display position, the mark being responsive to a second external instruction such that the mark functions as a switch, the switch having an on and an off mode; (c) displaying a menu including a plurality of process titles on the display screen when the switch is in the on mode; (d) selecting one of the plurality of process titles; and (e) storing the selected process title selected in step (d) as process information to be executed on the image part selected in step (a).

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 (A)–(E) show another process of interaction between the operator and image parts displayed on the screen of the CRT display 24;

DESCRIPTION OF THE PREFERRED EMBODIMENT

Figure 1:
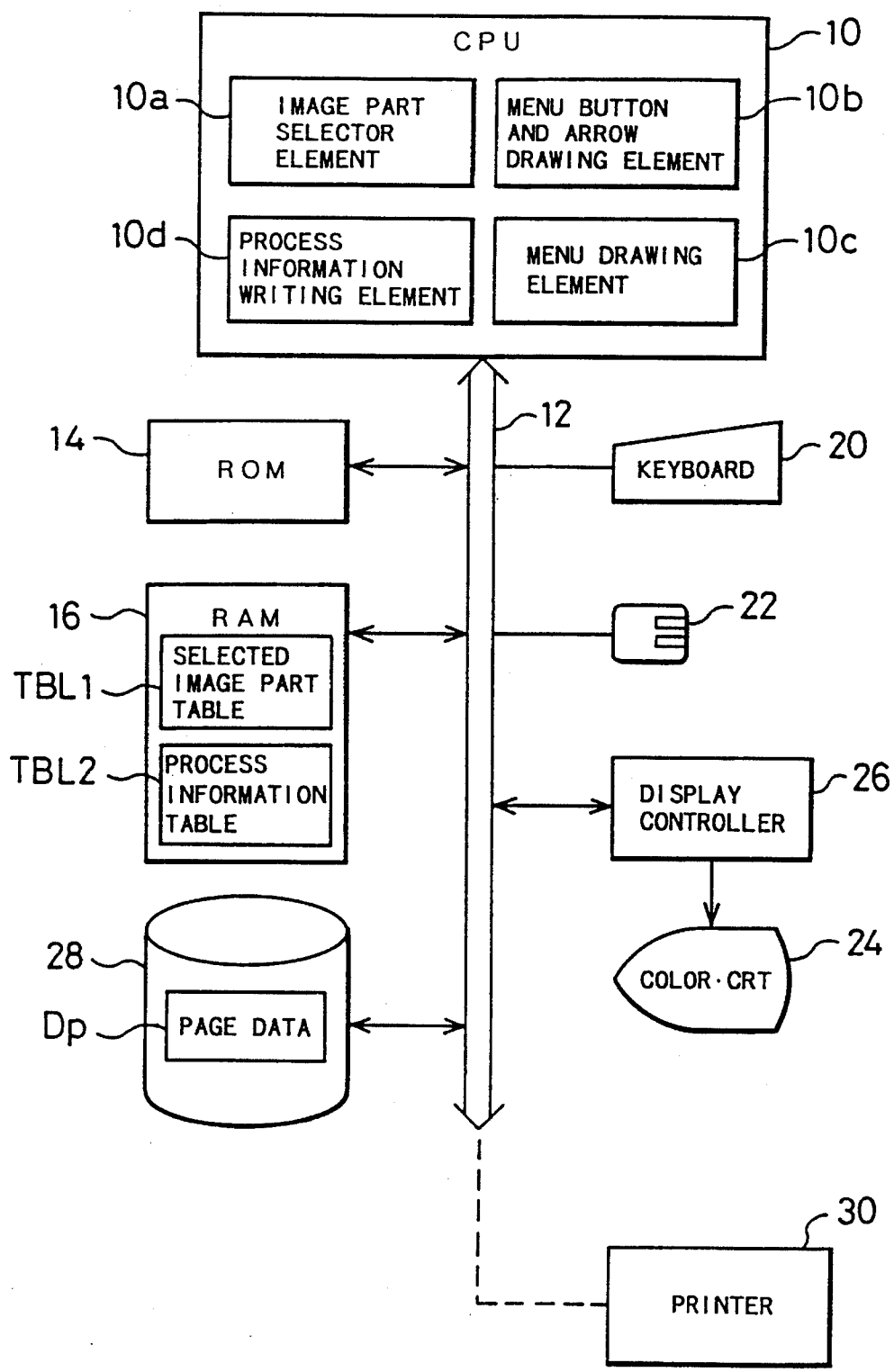
FIG. 1 is a block diagram showing an image processing apparatus used for selecting and displaying a printing process in accordance with the invention.

FIG. 1 is a block diagram showing an image processing apparatus used for selecting and displaying a printing process during prepress processing.

The image processing apparatus includes a CPU (central processing unit) 10, a ROM (read only memory) 14, and a RAM (random access memory) 16 connected to one another via a bus line 12. The bus line 12 is further connected with input devices, that is, a keyboard 20 and a mouse 22, and output devices, that is, a color CRT (cathode ray tube) display 24, via a display controller 26 and a printer 30 (shown schematically).

The bus line 12 is also connected with an external memory device, that is, a magnetic disk unit 28 for storing page data Dp representing a page composed of images for printing. The page corresponding to the page data Dp consists of a plurality of image parts previously prepared for the prepress process and laid out in a predetermined arrangement. The page data Dp includes mask data showing a lay-out area of these image parts and tint or picture data showing the image information in the mask data.

The CPU 10 executes programs previously stored in the ROM 14 so as to activate the functions of an image part selector element 10a, a menu button and arrow drawing element 10b, a menu drawing element 10c, and a process information writing element 10d. The CPU 10 implements the prepress processing for the image parts in a page corresponding to the page data Dp through activating the functions of the elements 10a through 10d. Actual steps of the operation of the prepress processing by the operator are described in detail below.

Figure 2:
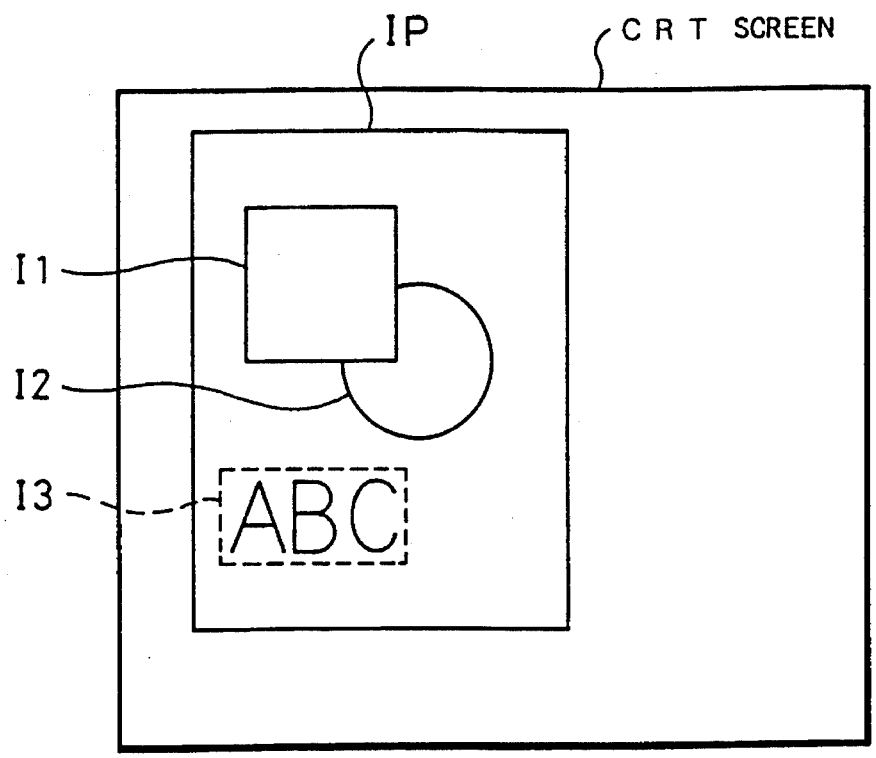
FIG. 2 illustrates a page, corresponding to page data Dp, displayed on a CRT screen.

The CPU 10 reads page data Dp representing a page IP out of the magnetic disk unit 28 and displays the page IP on the color CRT display 24 via the display controller 26. As shown in FIG. 2, the page IP includes a first image part I1 of square shape corresponding to first figure data, a second image part I2 of circular shape corresponding to second figure data, and a third image part I3 including characters A, B, and C corresponding to character data.

The operator observes and interacts with the screen of the color CRT display 24 (hereinafter referred to as the CRT screen) according to the steps shown in FIGS. 3 through 5, wherein the third image part I3 of the page IP is omitted for clarity of the drawing.

Figure 3E:
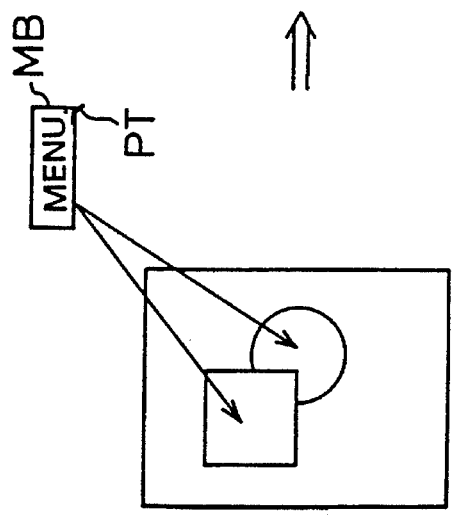
FIGS. 3 (A)–(H) show a process of interaction between an operator and image parts displayed on the screen of a CRT display 24.
Figure 3C:
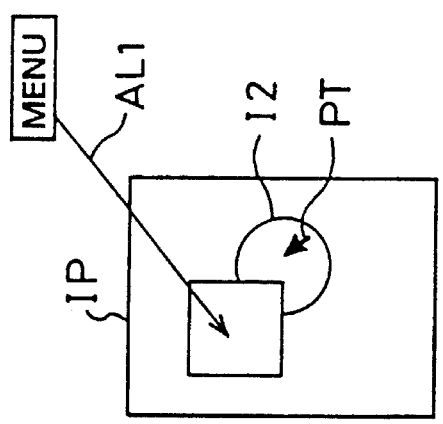
Figure 3D:
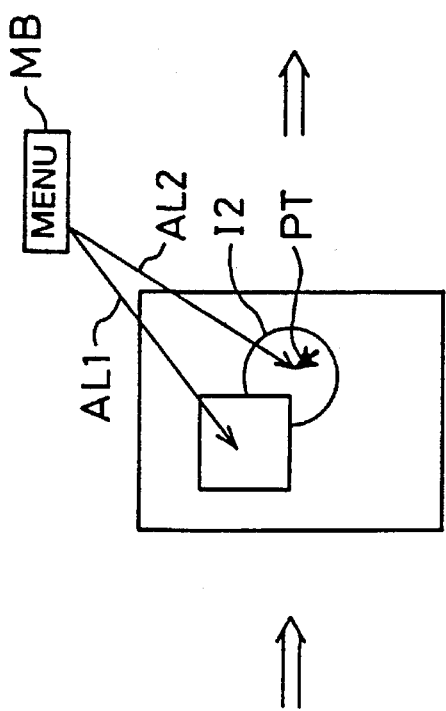
Figure 3B:
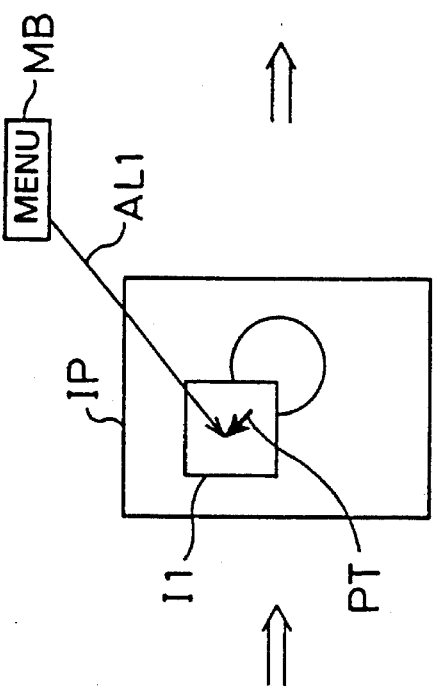
Figure 3A:
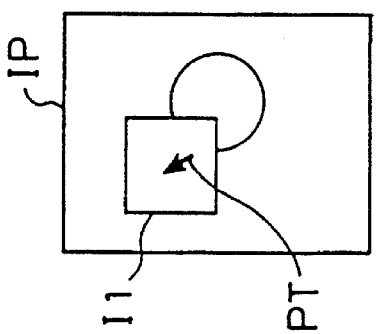

In a first step, the operator moves a pointer PT to the first image part I1 on the CRT screen with the mouse 22, as shown in FIG. 3A. The operator then clicks the mouse 22 so as to draw a menu button MB with the word "Menu" at a predetermined position together with a first arrow AL1 running from the menu button MB to the position of the pointer PT, as shown in FIG. 3B. The menu button MB is responsive to a pointer PT hit thereby functioning as a switch for opening a menu which shows a plurality of process titles. The process titles correspond to specific printing processes, which are discussed in detail below.

The operator subsequently moves the pointer PT with the mouse 22 to the second image part I2 on the CRT screen, as shown in FIG. 3C, and clicks the mouse 22 so as to draw a second arrow AL2 running from the menu button MB to the current position of the pointer PT, as shown in FIG. 3D.

Figure 3F:
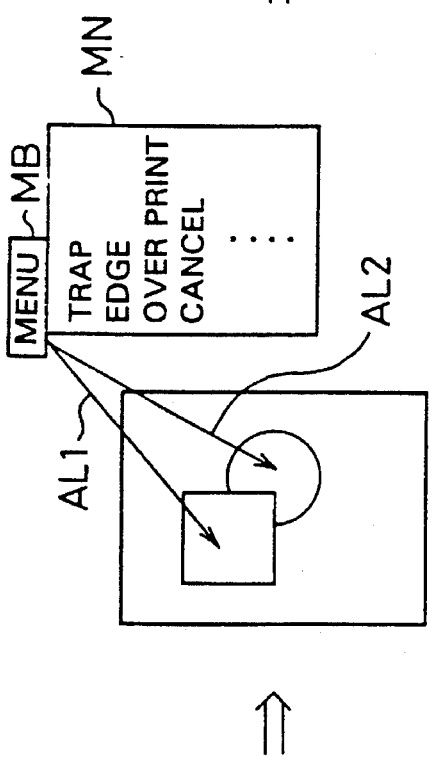

In a next step, shown in FIG. 3E, the operator moves the pointer PT with the mouse 22 to the menu button MB on the CRT screen, and then clicks the mouse 22 so as to call up a pull-down menu MN, including a plurality of process titles, as shown in FIG. 3F. The menu MN shows a plurality of specific process titles applicable to prepress processing of the two image parts, which may include "Trap" for a trapping process, "Edge" for an outline process, "Over Print" for an overprinting process, and "Cancel" for canceling the specific prepress process previously selected. The trapping process "Trap" expands an overlapped area between two image parts, including one or a plurality of pictures, characters, or the like. The outline process "Edge" makes a margin of certain width around a character or picture contour of an image. The overprinting process "Overprint" prints black characters over a background color.

Figure 3G:
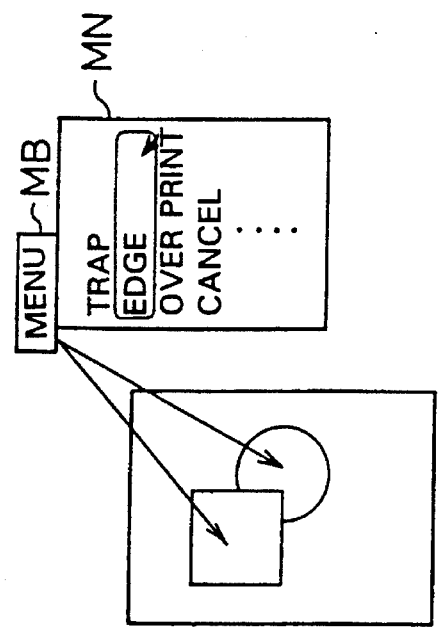

The operator subsequently moves the pointer PT with the mouse 22 to a desired title out of the plurality of process titles in the menu MN, as shown in FIG. 3G. For example, the operator moves the pointer PT to the title "Edge". When the operator clicks the mouse 22, the CPU 10 is activated so as to select process information corresponding to the title "Edge". More specifically, information specifying an outline process is stored in the RAM 16 as process information between image data representing the first image part I1 and that representing the second image part I2. The detailed process for storing such process information will be described later.

Figure 3H:
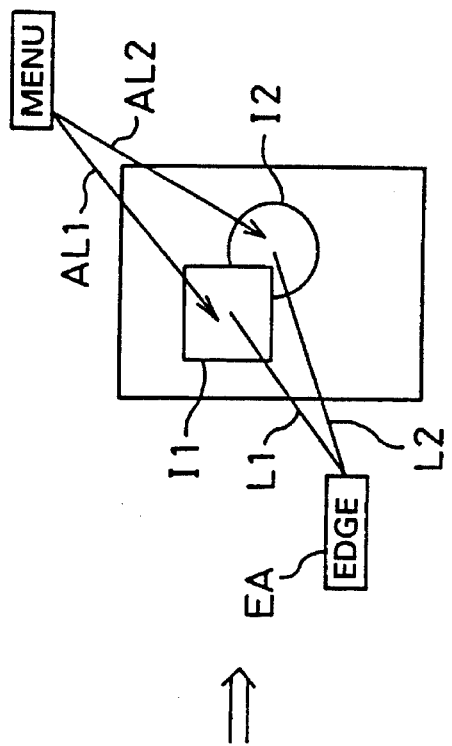

After completion of selecting a specific printing process, the menu MN is erased on the CRT screen. At a subsequent step as shown in FIG. 3H, a selected process display box EA including the selected process title ("Edge" in this embodiment) is drawn on the CRT screen together with line segments L1 and L2 running from the display box EA to the respective centers of the first image part I1 and the second image part I2. The line segments L1 and L2 may preferably be displayed on the CRT screen in a color different from that of the first and second arrows AL1 and AL2, which start from the menu button MB.

In this manner, specific prepress process information is selected and stored for execution between the image data representing the first image part I1 and image data representing the second image part I2. Process information may also be specified for only one image part, for example, the first image part I1, instead of for both the first and second image parts I1 and I2.

FIG. 4A shows a situation identical with that of FIG. 3B, where the operator selects the first image part I1 so that the first arrow AL1 is drawn to the first image part I1 according to the steps of FIGS. 3A and 3B. Then, the operator moves the pointer PT to the menu button MB on the CRT screen, as shown in FIG. 4B.

The operator clicks the mouse 22 to call up a pull-down menu MN, including a plurality of process titles, as shown in FIG. 4C. The menu MN shows a plurality of specific printing processes that are applicable to prepress processing of one image part against the background of the page IP, which may include "Edge" for outline process, "Over Print" for overprinting process, and "Cancel" for canceling the specific process previously selected.

The operator subsequently moves the pointer PT with the mouse 22 to a desired title out of the plurality of process titles in the menu MN, as shown in FIG. 4D. For example, the operator moves the pointer PT to the title "Edge". When the operator clicks the mouse 22, the CPU 10 is activated so as to select the process information corresponding to the title "Edge". More specifically, information specifying an outline process is stored for execution in the RAM 16 as prepress process information for the image data representing the first image part I1 against the background of the page image IP.

After completion of selecting a specific printing process, the menu MN is erased on the CRT screen. At a subsequent step, as shown in FIG. 4E, a selected process display box EA including the selected process title ("Edge" in this embodiment) is drawn on the CRT screen together with a line segment L3 running from the display box EA to the center of the first image part I1. The line segment L3 may preferably be displayed on the CRT screen in a color different from that of the first arrow AL1 starting from the menu button MB.

In this manner, specific process information is set for the first image part I1 against the background of the page IP.

Figure 5:
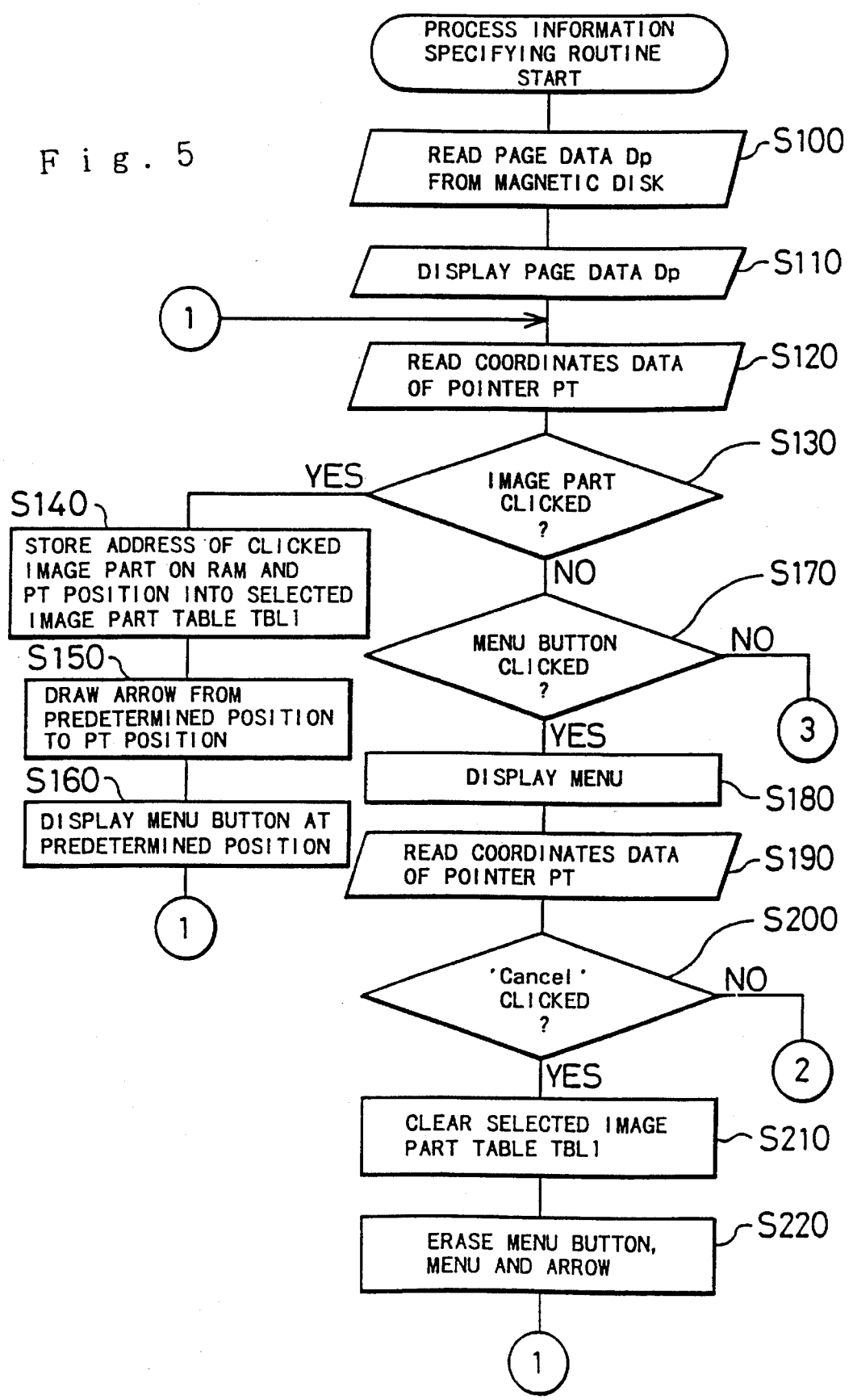
FIGS. 5 and 6 are flowcharts showing a routine for selecting a process that is executed by the CPU 10.

A routine for selecting a process that is executed by the CPU 10 is explained according to the flowcharts of FIGS. 5 and 6.

When the routine starts, the CPU 10 reads page data Dp representing a page IP out of the magnetic disk unit 28 and stores the page data Dp into the RAM 16 at step S100 of FIG. 5. At step S110, the CPU 10 outputs the page data Dp to the display controller 26 so as to display an image of the page IP on the color CRT display 24 via the display controller 26. The page IP, which has the size of a whole page, is displayed on the CRT screen.

When the operator clicks the mouse 22 while the page IP is displayed, the CPU 10 at step S120 reads a mouse driver so as to obtain the coordinates data representing a position of the pointer PT on the CRT screen. The program then goes to step S130 at which it is determined whether the position of the pointer PT on the CRT screen corresponding to the coordinates data is located in an image part of the page IP. In other words, it is determined whether an image part of the page IP has been selected and hit by the operator.

Figures 7, 8, 9:
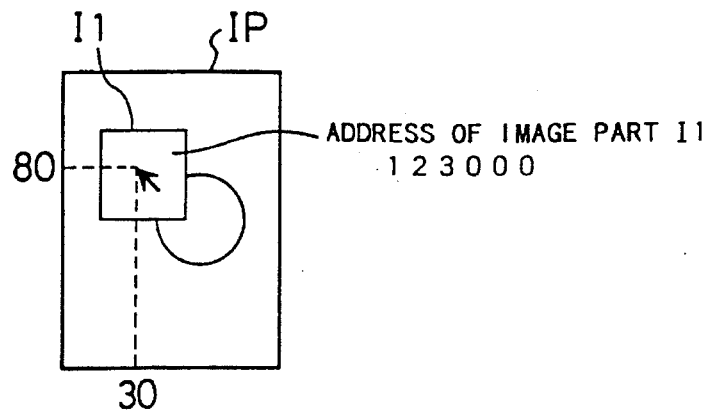
FIG. 7 is a view showing an address of a first image part I1 and coordinates at the position of the pointer PT hit on the CRT screen.
FIG. 8 shows a selected image part table TBL1.
FIG. 9 shows a process information table TBL2.

When the answer is YES at step S130, the program proceeds to step S140 at which the CPU 10 registers an address where the image part thus selected and hit is stored on the RAM 16 as well as the coordinates at the position of the pointer PT hit on the CRT screen into a selected image part table TBL1 on the RAM 16. For example, when the address representing the position of storing the clicked image part I1 is equal to '123000' and the coordinates at the position of the pointer PT hit on the CRT screen are equal to (30,80), as shown in FIG. 7, an image part address TBL1A(= 123000) and hit point coordinates TBL1B (=(30,80)) are written in the selected image part table TBL1 on the RAM 16, as shown in FIG. 8.

After execution of step S140, the program goes to step S150 at which the CPU 10 displays an arrow running from a predetermined position to the position corresponding to the hit point coordinates on the CRT screen. At the subsequent step S160, the CPU 10 displays the menu button MB at the predetermined position. Execution of the steps S120 through S160 completes the process shown in FIGS. 3A and 3B. The program then returns to step S120 to await the next instruction from the operator. Subsequent execution of the steps S120 through S160, wherein hit of another image part is determined at step S130, further completes the process shown in FIGS. 3C and 3D. The image part hit in the first cycle of the steps S120 through S160 is designated as the first image part while the other image part hit in the second cycle of the steps S120 through S160 is referred to as the second image part.

When the answer is NO at step S130, on the other hand, the program goes to step S170 at which it is determined whether the position of the pointer PT on the CRT screen, shown by the coordinates data read at step S120, is located at the menu button MB, that is, whether the menu button MB is hit or clicked. When it is determined that the menu button MB is hit, the program goes to step S180 at which the CPU 10 displays a pull-down menu MN including a plurality of process titles. CPU 10 selects one of a plurality of sets of the plurality of process titles for display in the menu MN according to the number of image parts hit at step S130. As described above, when two image parts are hit at step S130, process titles applicable to two image parts are selected, which include "Trap", "Edge", "Over Print", and "Cancel". When only one image part is hit at step S130, on the other hand, process titles applicable to one image part against the background of the page IP are selected, which include "Edge", "Over Print", and "Cancel". Execution of steps S170 and S180 completes the process shown by FIGS. 3E and 3F or FIGS. 4B and 4C.

In response to the click operation of the mouse 22 by the operator, the CPU 10 reads the mouse driver to obtain the coordinates data representing a position of the pointer PT on the CRT screen at step S190. The program then goes to step S200 at which it is determined whether the position of the pointer PT on the CRT screen shown by the coordinates data is located in an area of the title "Cancel" in the menu MN displayed on the CRT screen. In other words, it is determined whether the title "Cancel" is clicked or hit.

When the answer is YES at step S200, the program goes to step S210 at which the CPU 10 clears the selected image part table TBL1 stored on the RAM 16, and then proceeds to step S220 at which the CPU 10 erases the menu button MB, the menu MN, and the arrow or arrows AL displayed on the CRT screen. The program then returns to step S120 to await the next instruction from the operator.

Figure 6:
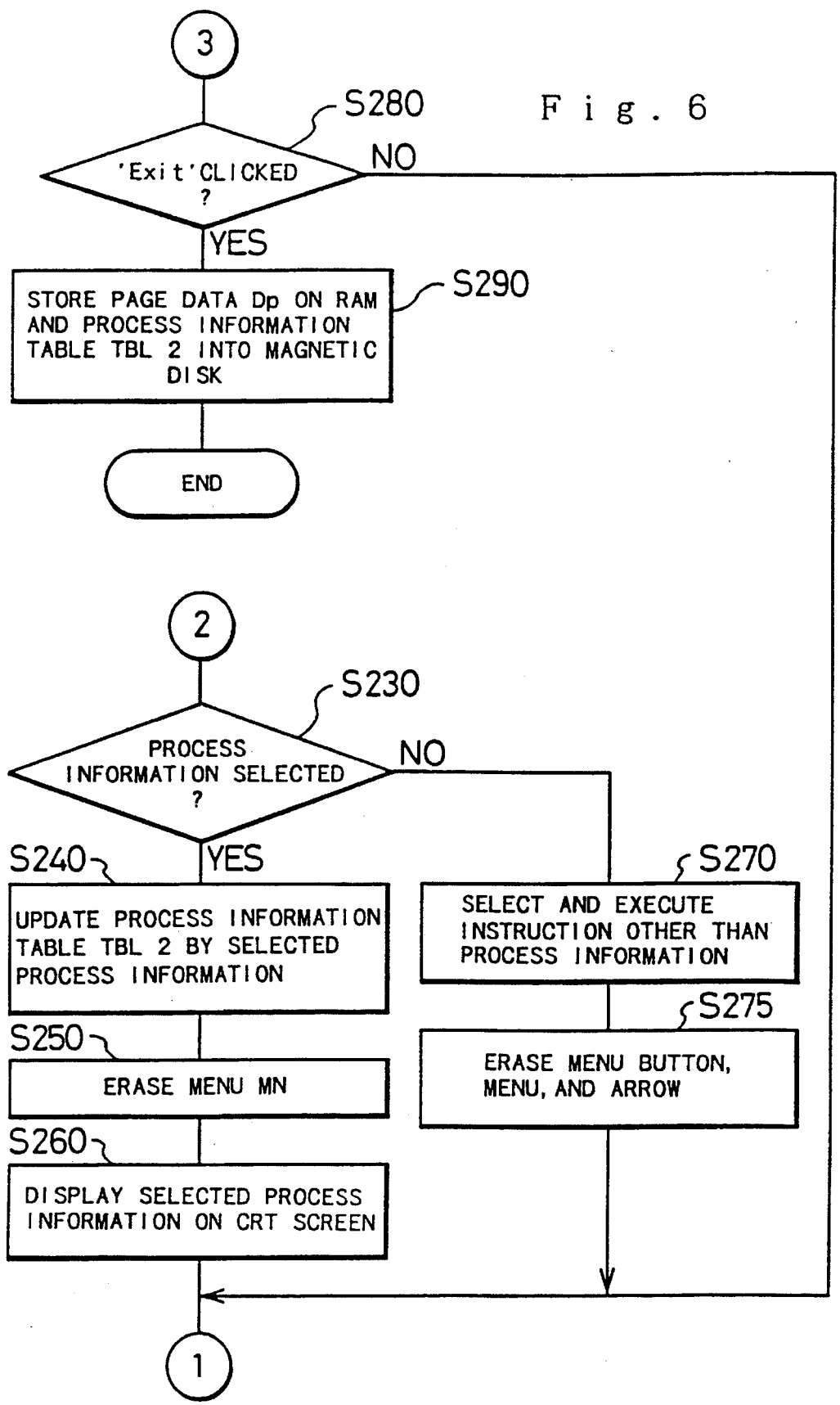

When it is determined that the title "Cancel" is not hit at step S200, on the other hand, the program goes to step S230 in the flowchart of FIG. 6. At step S230, it is determined whether the position of the pointer PT on the CRT screen, corresponding to the coordinates data read at step S190, is located in an area of another process title other than "Cancel", for example, "Trap", "Edge", or "Over Print", in the menu MN that is displayed on the CRT screen. Namely, it is determined whether a process title other than "Cancel" is clicked or hit.

When the answer is YES at step S230, the program goes to step S240 at which a process information table TBL2 stored on the RAM 16 is updated with the process information that corresponds to the process title hit at step S230. More specifically, the CPU 10 reads the addresses on the RAM 16 at which the target image parts for which the process title has been selected are stored that is, the first image part and the second image part, out of the selected image part table TBL1 stored on the RAM 16. The CPU 10 subsequently stores the process title hit or clicked at step S230 and attribute data of the process information (for example, the width of an outline in "Edge") as well as the addresses in the process information table TBL2, as shown in FIG. 9. When the title "Over Print" is selected as the desired process the CPU 10 stores only the address of the first image part as the target of the overprinting process.

The process information table TBL2 includes a plurality of records supplemented at every execution of step S240. The final process information table TBL2 stores all of the prepress process information selected for the page IP corresponding to the page data Dp by each record unit.

The program then goes to step S250 at which the CPU 10 erases the menu MN displayed on the CRT screen so as to show only the menu button MB and the arrow or arrows AL. At a subsequent step S260, the process title for which information has been newly supplemented onto the process information table TBL2 at step S240 is displayed on the CRT screen. More specifically, the CPU 10 draws a selected process display box EA, at a position close to the target image part for which the process title has been selected, on the CRT screen, and then draws a line segment running from the box EA to the center of the target image part. The selected process display box EA is movable to any desired position on the CRT screen by the operation of the mouse 22. Execution of steps S230 through S260 completes the process shown by FIGS. 3G and 3H or FIGS. 4D and 4E. The program then returns to step S120 of FIG. 5 to await the next instruction from the operator.

The menu button MB and the arrow or arrows AL remain on the CRT screen after the execution of step S250. This allows the CPU 10 to execute other processing on the selected image parts subsequent to selecting the previous process titles. For such a subsequent process, the menu MN includes at least one instruction other than the process titles, for example, "Move" for shifting the position of the target image part. Another click of the menu button MB after selection of the process title re-opens the menu MN for selecting an instruction other than a process title. This allows for continuous processing with respect to the target image parts. When another image part is hit after execution of the selected instruction, the CPU 10 erases the menu MN together with the menu button MB and the arrow or arrows AL displayed on the CRT screen.

When it is determined that no process title is hit at step S230, on the other hand, the program goes to step S270 at which an instruction other than a process title, for example, "Move", is selected out of those previously registered in the menu MN and then executed. At the subsequent step S275, the CPU 10 erases the menu button MB, the menu MN, and the arrow or arrows AL displayed on the CRT screen in the same manner as in step S250. The program then returns to step S120 of FIG. 5 to wait for another instruction from the operator.

When it is determined that the menu button MB was not clicked or hit at step S170 of FIG. 5, the program goes to step S280 at which it is determined whether the program should exit from this routine. More specifically, it is determined whether the position of the pointer PT, corresponding to the coordinates data read at step S120, is located in a menu title "Exit" of the title bar displayed on the CRT screen.

When the answer is YES at step S280, the program goes to step S290 at which the page data Dp and the process information table TBL2 stored on the RAM 16 are stored on magnetic disk unit 28. The addresses of the first image part and the second image part in the process information table TBL2 are respectively converted into the names of the first image part and the second image part before the process information table TBL2 is stored in magnetic disk unit 28. The program then goes to END to exit from this routine. Alternatively, when the answer is NO at step S280 the program returns to step S120 to wait for another instruction from the operator.

In the process selection routine of FIGS. 5 and 6, the steps S120 and S130 function as the image part selector element 10a, the steps S140 through S160 as the menu button and arrow drawing element 10b, the steps S170 and S180 as the menu drawing element 10c, and the steps S230 and S240 as the process information writing element 10d.

Figure 11:
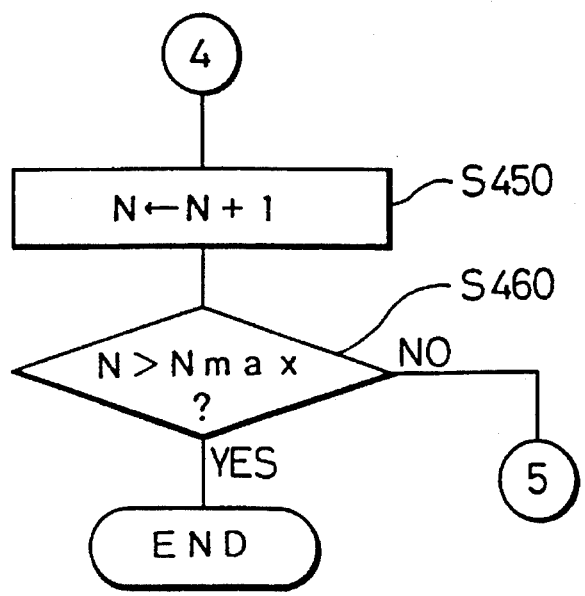
FIGS. 10 and 11 are flowcharts showing a process display routine that is executed by the CPU 10.
Figure 10:
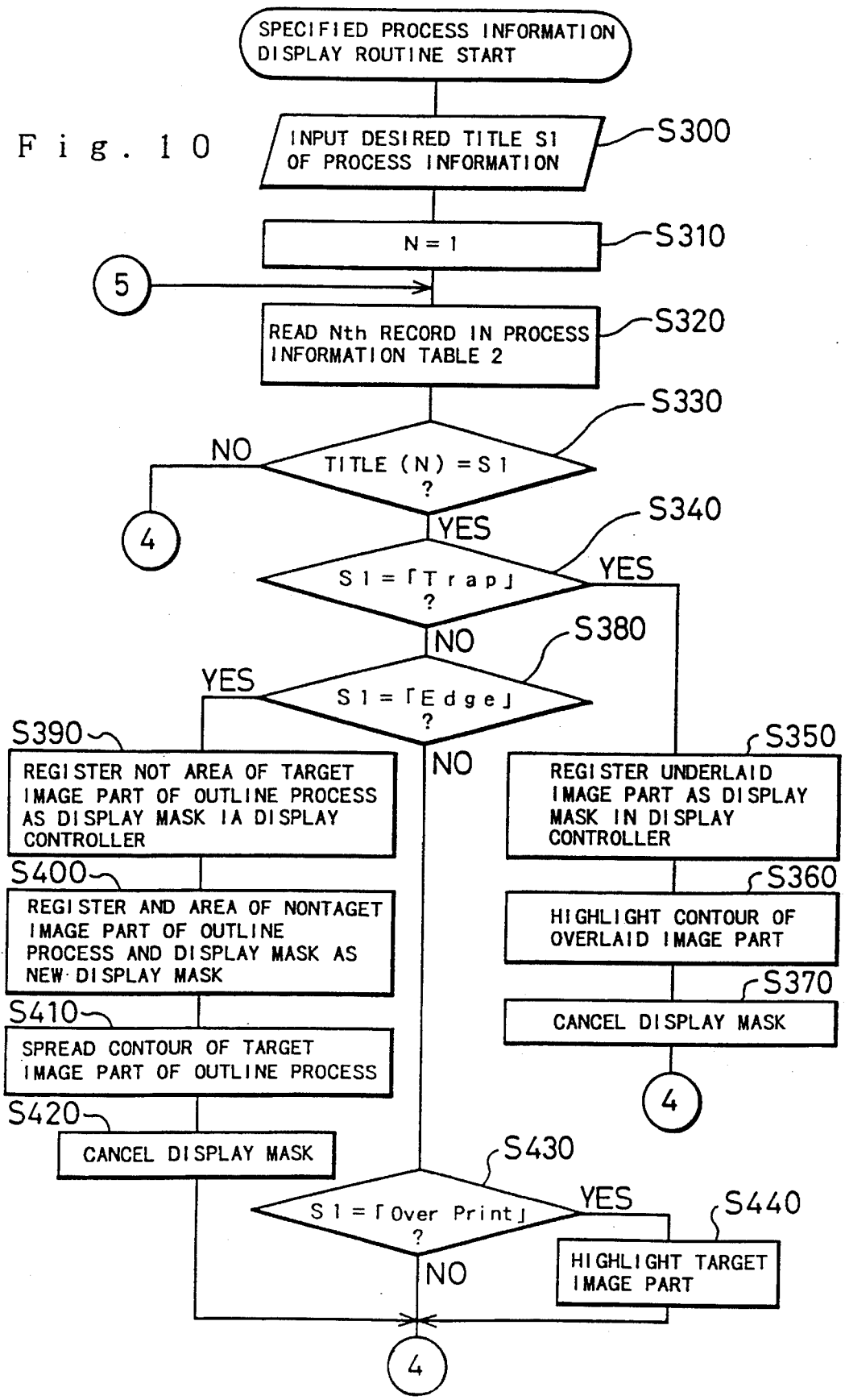

A display routine for distinctively displaying a process title representing a specific prepress printing process and a target area for the selected process is explained according to the flowcharts of FIGS. 10 and 11, where the process title is selected by the process selecting routine that is shown in the flowcharts of FIGS. 5 and 6. The CPU 10 executes the display routine when the operator clicks a process display button previously set on the CRT screen with the mouse 22.

Figure 12:
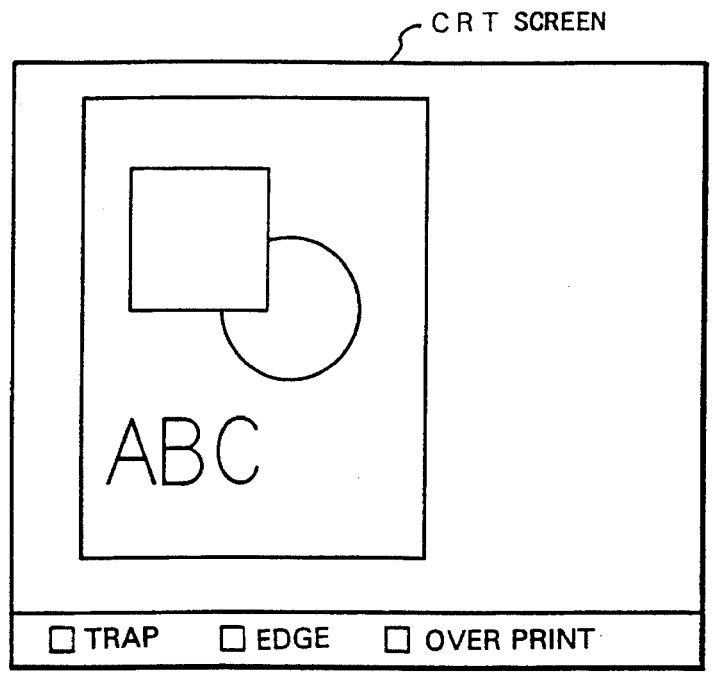
FIG. 12 shows a CRT screen after the process display button is clicked.

When the routine is started by a click of the process display button, the operator selects at step S300 a title S1 for a process that is to be displayed. When the process display button is clicked, a title bar including a plurality of process titles is displayed on the bottom of the CRT screen as shown in FIG. 12. The operator selects and clicks a title S1 out of the plurality of titles on the CRT screen.

At the subsequent step S310, a variable N is initialized and set equal to one. The program then goes to step S320 at which an Nth record is read out of the process information table TBL2 stored on the RAM 16. At step S330, a title (N) of process information stored in the Nth record is compared with the title S1 input at step S300. When (N) is equal to S1, the program goes to step S340 at which it is determined whether or not the title S1 is "Trap". When the answer is YES at step S340, the program goes to step S350 at which the CPU 10 compares the addresses of the first image part and the second image part stored in the Nth record, which was read at step S320, with each other. The program then determines an underlying image part based on the result of the comparison, and registers an area of the underlying image part as a display mask in the display controller 26. Here the larger address of the image part shows an underlying position. When the display mask is registered in the display controller 26 at step S350, only the area of the display mask is shown on the color CRT display 24.

Figure 13:
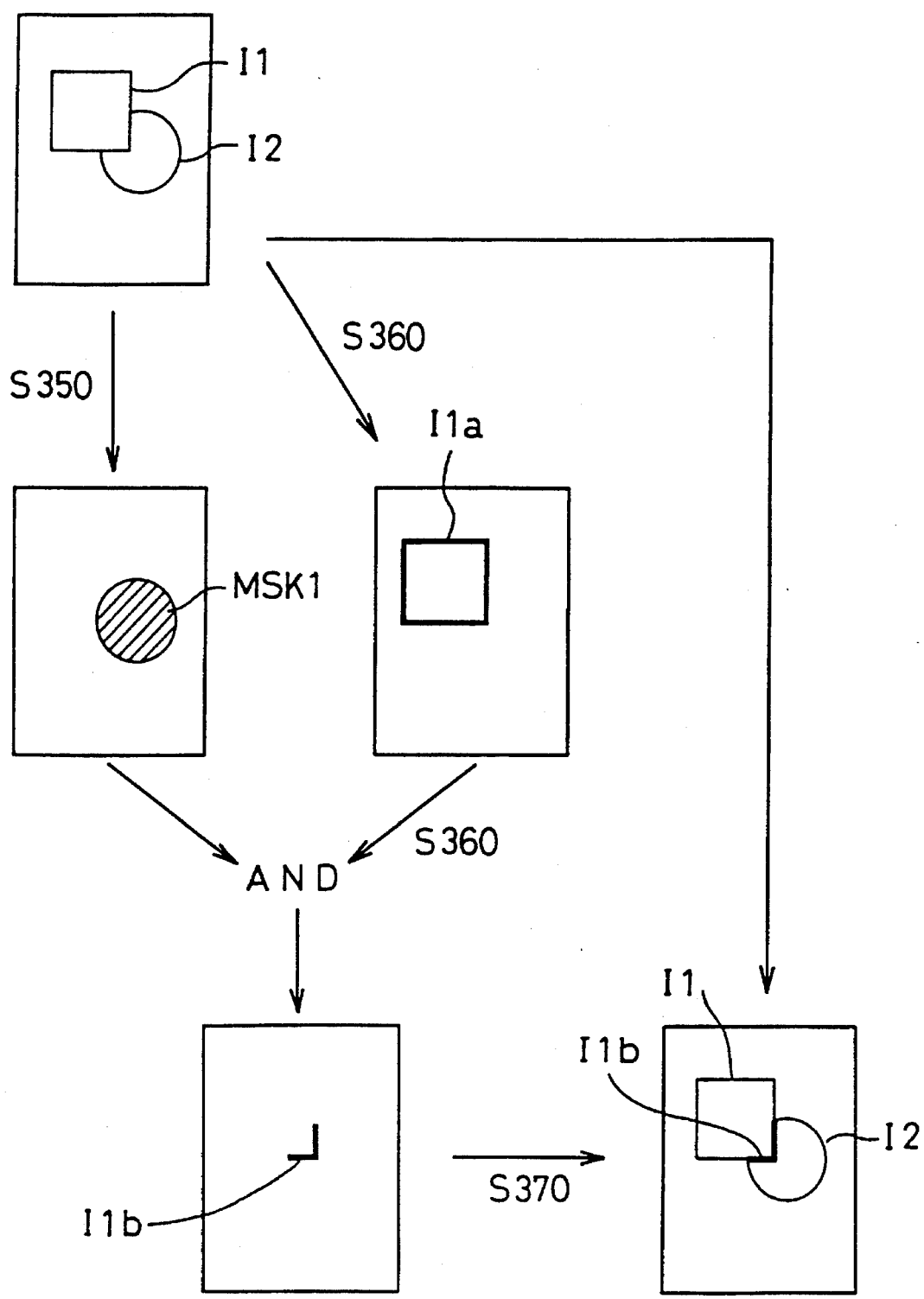
FIG. 13 shows an example of change in the display of the image parts through the trapping process.

FIG. 13 shows an example of change in the screen display through the process subsequent to step S350. When the first image part I1 is overlapped with the second image part I2 as shown in FIG. 13, the area of the underlying second image part I2 is registered as a mask MSK1 in the display controller 26.

After execution of step S350 in the flowchart of FIG. 10, the program goes to step S360 at which the CPU 10 determines an overlaid image part based on the addresses of the first image part and the second image part stored in the Nth record read at step S320, and highlights a contour of the overlaid image part on the color CRT display 24. Since the display mask registered in the display controller 26 is not canceled, such enhancing display of the contour is limited to the area of the display mask. Accordingly, only an image segment corresponding to a trapped area between the first image part I1 and the second image part I2 is highlighted on the CRT screen.

In the example of FIG. 13, the contour of the first image part I1 is extracted as a highlighted image I1a through execution of step S360. An AND operation of the highlighted image I1a and the display mask MSK1 results in the display of an image segment I1b, which is a part of the contour of the first image part I1.

After execution of step S360, the program goes to step S370 at which the display mask registered in the display controller 26 is canceled. In the example of FIG. 13, the display mask MSK1 is canceled, and the image segment I1b corresponding to the trapped area between the first image and second image parts I1 and I2 is displayed together with the first and second image parts I1 and I2 on the CRT screen.

When it is determined at step S340 that the selected title S1 is not "Trap", the program goes to step S380 at which it is determined whether the selected title S1 is "Edge". When the answer is YES at step S380, the program proceeds to step S390, at which the CPU 10 extracts a target image part (the first image part) for the outline process based on the addresses of the first and second image parts stored in the Nth record, which was read at step S320, and registers a NOT area of the target image part as a first display mask in the display controller 26.

Figure 14:
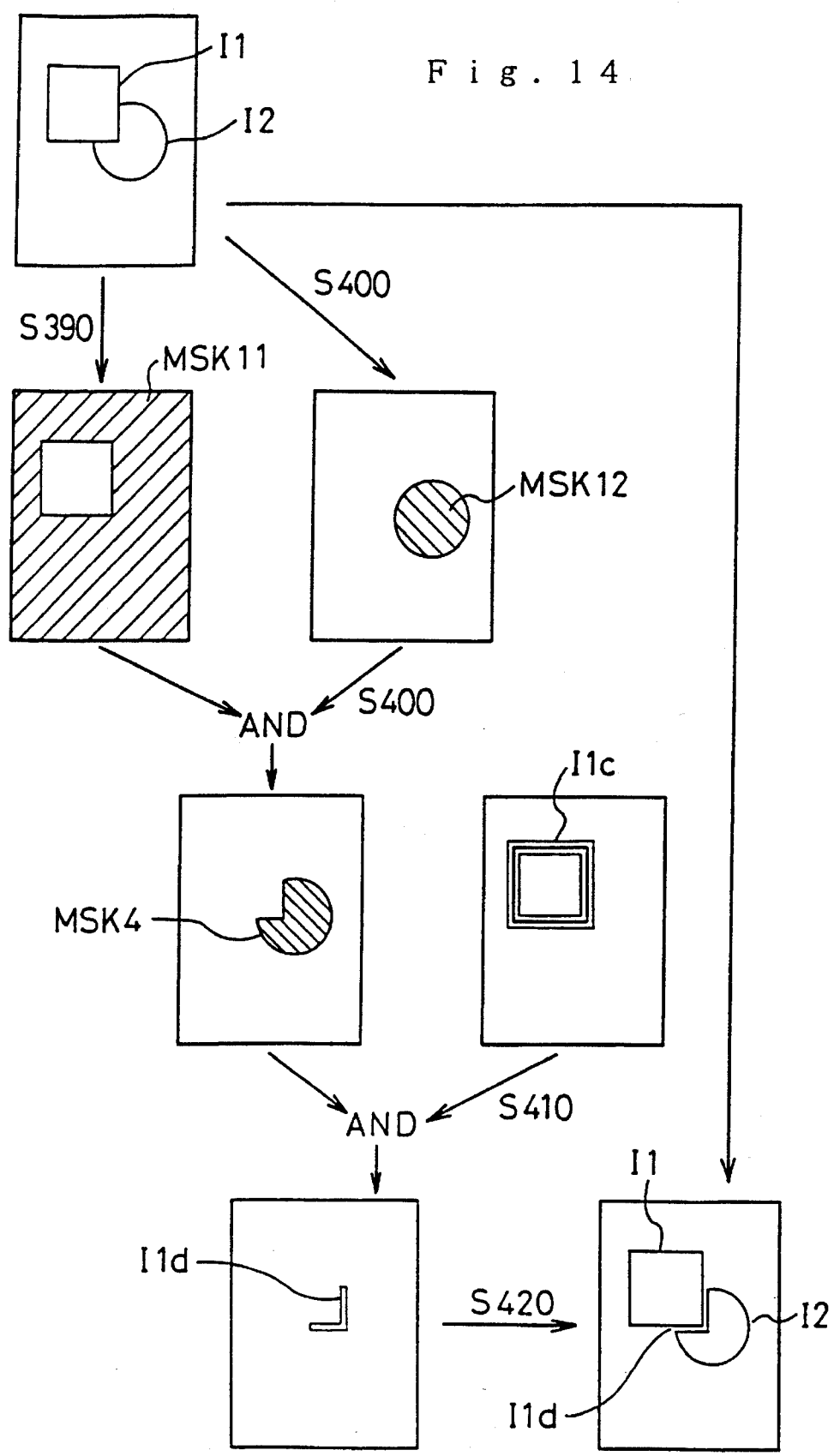
FIG. 14 shows an example of change in the display of the image parts through the outline process.
Figure 16:
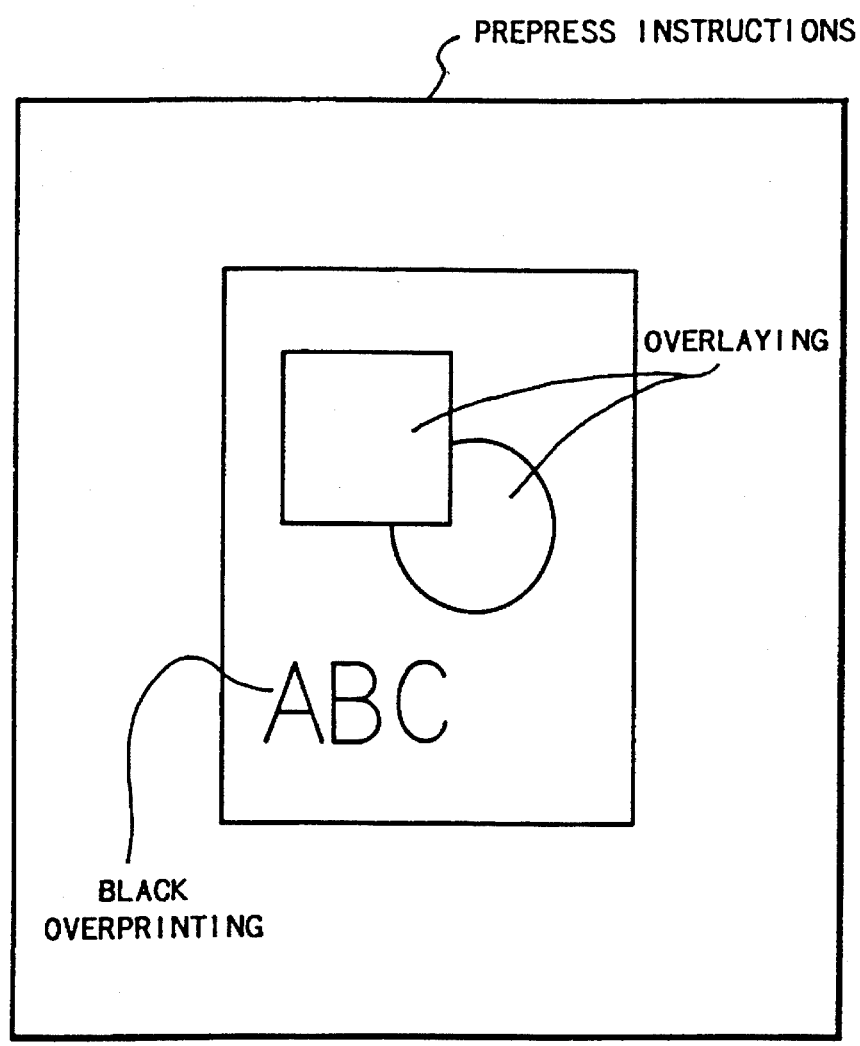
FIG. 16 shows a typical example of prepress instructions generally used.

FIG. 14 shows an example of change in the screen display through the process subsequent to step S390 in the flowchart of FIG. 10. When the first image part I1 and the second image part I2 are overlapped with each other as shown in FIG. 14, a NOT area of the overlying first image part I1 is registered as a first display mask MSK11 through execution of step S390. After execution of step S390 in the flowchart of FIG. 10, the program proceeds to step S400 at which the CPU 10 specifies a non-target image part (the second image part) for the outline process as a second display mask, executes an AND operation between the first display mask, which was registered at step S390, and the second display mask, and registers the result of the AND operation as a third display mask in the display controller 26. Namely, the first display mask is replaced by the resulting third display mask in the display controller 26. In the example of FIG. 14, a second display mask MSK12 of the second image part I2 is selected, and an AND area between the first display mask MSK11 and the second display mask MSK12 is registered as a third display mask MSK13 through execution of step S400.

After execution of step S400, the program proceeds to step S410 at which the CPU 10 spreads the contour of the target image part (the first image part) for the outline process in both the external and internal directions and displays the spread contour of the target image part. Since the third display mask MSK13, which was registered at step S400, is not canceled, display of the spread area is limited to the third display mask. Accordingly, an outline area between the first image part I1 and the second image part I2 is displayed on the CRT screen. In the example of FIG. 14, the CRT screen shows an image area I1c generated by the two-way spreading of the contour of the first image part I1 as well as the resulting outline area I1d, which is an AND area between the image area I1c and the third display mask MSK13.

The program then goes to step S420 at which the third display mask in the display controller 26 is canceled. In the example of FIG. 14, the third display mask MSK13 is canceled, and the resulting outline area I1d between the first image part I1 and the second image part I2 is displayed with the first and second image parts I1 and I2 on the CRT screen.

When it is determined that the selected title S1 is not "Edge", the program goes to step S430 to determine whether the selected title S1 is "Over Print". When the answer is YES at step S430, the program proceeds to step S440 at which the first image part stored in the Nth record, which was read at step S320, is displayed in an enhanced manner, for example, in a different color. The program then goes to step S450 in the flowchart of FIG. 11 at which the variable N is increased by one. When it is determined that the selected title S1 is not equal to any process title (N) at step S330, or when it is determined that the selected title S1 is not equal to "Over Print" at step S430, or after execution of step S420 or S370, the program also goes to step S450 so as to increment the variable N by one.

At the subsequent step S460, the variable N is compared with a number of records Nmax stored in the process information table TBL2. When the variable N is greater than Nmax, the CPU 10 determines that all of the target image areas having process information have been displayed for all of the records stored in the process information table TBL2, and the program exits from the routine. When the variable N is equal to or smaller than Nmax, on the other hand, the program returns to step S320 to repeat the processing of steps S320 through S460.

Figure 15:
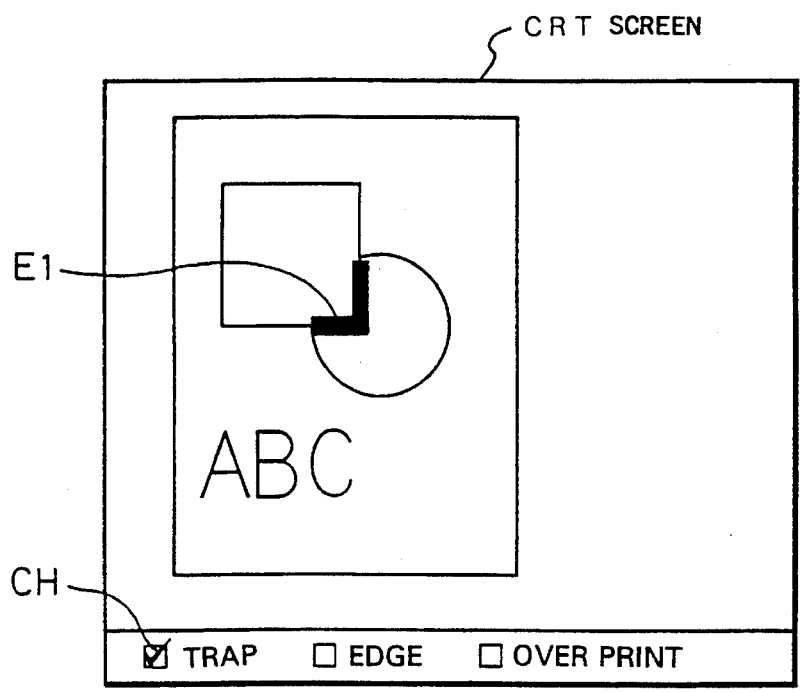
FIG. 15 shows an exemplified display on the CRT screen after execution of a prepress process.

FIG. 15 shows an exemplified display on the CRT screen including a process title representing a selected printing process and a target image area for the selected process. In the example of FIG. 15, a check CH in the "Trap" box of the title bar on the bottom of the CRT screen shows selection of the title "Trap". A target image area E1 for the selected process "Trap" is also displayed between the two image parts on the CRT screen. The operator can thus clearly and distinctively find the target area for the selected process "Trap" on the CRT screen. When there are a plurality of target image areas for the process "Trap", the plurality of target image areas are simultaneously displayed on the CRT screen.

As described above according to these embodiments, the operator knows the target image parts for selected process titles since the target image parts are distinctively pointed to by the arrows AL1 and AL2 when a desired process title is selected out of the menu MN, as clearly seen in FIG. 3F or FIG. 4D. Such structure for pointing to the image parts with the arrows AL1 and AL2 is in some respects similar to the conventional prepress instructions with which the operator is familiar, thus improving the operator's ability and working efficiency and saving the time required for completing the prepress processing.

A pull-down menu, which is shown at the starting point of the arrows AL1 and AL2, distinctively indicates the next step the operator should take. The selected process display box EA as well as the line segments L1 and L2, which connect the selected process display box EA to the target image parts, are displayed on the CRT screen immediately after selection of a certain process title, as is seen in FIG. 3H or FIG. 4E. The operator can readily check the selected process and its target image area on the CRT screen even after the completion of the selection step. A click of the process information display button, which is previously set on the CRT screen, shows the selected process titles, each representing a specific process, and one or a plurality of target areas for the selected processes.

The invention is not limited to the above embodiments. Some of the possible modifications are given below. Although a click on the menu button MB with the mouse 22 calls up the pull-down menu MN so as to be displayed immediately below the menu button MB in the above embodiment, a menu bar that is displayed on the top of the CRT screen may also include a plurality of process titles.

The line segments L1 and L2 connecting the selected process display box EA to the target image parts may be replaced with arrows running to the target image parts. Alternatively, the selected process display box EA may be shown in the place of the menu button MB after selection of a specific process title while the arrows AL1 and AL2 starting from the menu button MB remain on the CRT screen.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for selecting and displaying a printing process during prepress processing, in which a plurality of image parts are displayed on a display screen, said apparatus comprising:

image part selector means for selecting at least one image part out of said plurality of image parts displayed on said display screen, said image part being selected by said image part selector means in response to a first external instruction inputted by an operator;

switch and line display means for drawing at least one line on said display screen when said image part is selected by said selector means, said line connecting said image part selected by said selector means to a display position on said display screen, and for simultaneously displaying a mark at said display position, said mark being responsive to a second external instruction inputted by the operator such that said mark functions as a switch, said switch having an on and an off mode;

menu display means for displaying a menu including a plurality of process titles on said display screen when said switch is in said on mode, said plurality of process titles representing a corresponding plurality of printing processes;

process selector means for selecting one of said plurality of process titles in said menu in response to a third instruction inputted by the operator; and memory means for storing said selected process title selected by said process selector means as process information to be executed on said image part selected by said image part selector means.

2. An apparatus in accordance with claim 1, further comprising a printer for receiving said process information from said memory means and operable for printing of said image part.

3. An apparatus in accordance with claim 1, wherein said menu display means includes a plurality of sets of process titles and means for selecting one of said plurality of sets for display in said menu according to the number of image parts selected by said image part selector means.

4. An apparatus in accordance with claim 3, wherein said plurality of process titles for display in said menu include a specific title showing a printing process for two image parts when said number of image parts selected by said image part selector means is equal to two.

5. An apparatus in accordance with claim 3, wherein said plurality of process titles for display in said menu include a specific title showing a printing process for one image part against a background image when said number of image parts selected by said image part selector means is equal to one.

6. An apparatus in accordance with claim 4, wherein said plurality of process titles for display in said menu include at least three process titles, "Trap" indicating a process of expanding an overlapped area between two image parts, "Edge" indicating a process of making a margin of certain width around a contour of an image, and "Over Print" indicating a process of printing black characters over a background color.

7. An apparatus in accordance with claim 5, wherein said plurality of process titles for display in said menu comprise at least two process titles, "Edge" and "Over Print".

8. An apparatus in accordance with claim 1, wherein said image part selector means further comprises:

a pointing device for pointing to a desired position on said display screen; and said at least one line drawn by said switch and line display means runs from said desired position set by said pointing device.

9. An apparatus in accordance with claim 8, wherein said menu display means further comprises menu position setting means for setting a position of said menu immediately below said mark on said display screen.

10. An apparatus in accordance with claim 1, said apparatus further comprising:

selected process display means for displaying said selected process title stored by said memory means at a position in the vicinity of said image part selected by said image part selector means, and for drawing at least one line connecting said position to said image part.

11. An apparatus in accordance with claim 10, said apparatus further comprising:

display control means for canceling a display of said menu displayed by said menu display means while maintaining a display of said mark and said line drawn by said switch and line display means after said process selector means selects said selected process title.

12. An apparatus in accordance with claim 1, said apparatus further comprising:

title input means for inputting a predetermined process title;

extraction means for extracting process information corresponding to said predetermined process title inputted by said title input means from said process information stored in said memory means; and target image part display means for determining a target image part for said process information extracted by said extraction means and for displaying said target image part distinctively from other image parts on said display screen.

13. A method of selecting and displaying a printing process during prepress processing, in which a plurality of image parts are displayed on a display screen, said method comprising the steps of:

(a) selecting at least one image part out of said plurality of image parts displayed on said display screen in response to a first external instruction;

(b) drawing at least one line connecting said image part selected in step (a) to a display position on said display screen and simultaneously displaying a mark at said display position, said mark being responsive to a second external instruction such that said mark functions as a switch, said switch having an on and an off mode;

(c) displaying a menu including a plurality of process titles on said display screen when said switch is in said on mode;

(d) selecting one of said plurality of process titles; and (e) storing said selected process title selected in step (d) as-process information to be executed on said image part selected in step (a).

14. A method in accordance with claim 13, wherein step (c) comprises the steps of:

providing a plurality of sets of process titles and selecting one of said plurality of sets for display in said menu according to the number of image parts selected in step (a).

15. A method in accordance with claim 14, wherein said plurality of process titles for display in said menu include a specific title showing a printing process for two image parts when said number of image parts selected in step (a) is equal to two.

16. A method in accordance with claim 14, wherein said plurality of process titles for display in said menu include a specific title showing a printing process for one image part against a background image when said number of image parts selected in step (a) is equal to one.

17. A method in accordance with claim 15, wherein said plurality of process titles for display in said menu include at least three process titles, "Trap" indicating a process of expanding an overlapped area between two image parts, "Edge" indicating a process of making a margin of certain width around a contour of an image, and "Over Print" for printing black characters over a background color.

18. A method in accordance with claim 16, wherein said plurality of process titles for display in said menu comprise at least two process titles, "Edge" and "Over Print".

19. A method in accordance with claim 13, wherein step (a) further comprises the step of:

pointing to a desired position on said display screen; and said at least one line drawn in step (b) runs from said desired position.

20. A method in accordance with claim 19, wherein step (c) further comprises the step of:

setting a position of said menu immediately below said mark on said display screen.

21. A method in accordance with claim 13, further comprising the step of:

displaying said selected process title stored in step (e) at a position in the vicinity of said image part selected in step (a), and drawing at least one line connecting said position to said image part.

22. A method in accordance with claim 21, further comprising the step of:

canceling a display of said menu displayed in step (c) while maintaining a display of said mark and said line drawn in step (b) after selecting one of said process titles in step (d).

23. A method in accordance with claim 13, further comprising the steps of:

(f) inputting a predetermined process title;

(g) extracting process information corresponding to said predetermined process title inputted in step (f) from said process information stored in step (e); and (g) determining a target image part for said process information extracted in step (g) and displaying said target image part distinctively from other image parts on said display screen.

\* \* \* \* \*